United States Patent [19]

Hellon

[11] Patent Number: 4,993,902

[45] Date of Patent: Feb. 19, 1991

[54] PLASTIC CAPPED LOCK NUT

[75] Inventor: Keith Hellon, Libertyville, Ill.

[73] Assignee: MacLean-Fogg Company, Mundelein, Ill.

[21] Appl. No.: 564,868

[22] Filed: Aug. 9, 1990

[51] Int. Cl.⁵ ............................................. F16B 37/14
[52] U.S. Cl. .................................... 411/430; 411/372; 411/377; 411/303; 10/86 C
[58] Field of Search ............... 411/302, 303, 371, 372, 411/373, 375, 377, 429, 430, 431; 10/86 C

[56]  References Cited
U.S. PATENT DOCUMENTS

| 4,824,305 | 4/1989 | McCauley | 411/374 |
| 4,887,950 | 12/1989 | Sakayori et al. | 411/431 |
| 4,900,206 | 2/1990 | Kazino et al. | 411/431 |

FOREIGN PATENT DOCUMENTS

| 507104 | 6/1939 | United Kingdom | 411/302 |
| 618388 | 2/1949 | United Kingdom | 411/302 |

Primary Examiner—Neill R. Wilson
Attorney, Agent, or Firm—Mason, Kolehmainen, Rathburn & Wyss

[57] ABSTRACT

A plastic capped lock nut includes a metal body having a threaded bore extending axially between transverse opposite end faces and includes an annular wall extending outwardly of one of the end faces to define an open ended cavity for receiving a resilient lock ring mounted in the cavity in coaxial alignment with the threaded bore. An end cap of plastic material including an annular side wall and an outer end engages the lock ring and is sonically welded thereto. The annular wall of the metal body is deflected inwardly tightly against the lock ring to secure the ring in the cavity against rotation relative to the body. The end cap provides protection for exposed threads of a threaded rod or other element extending outwardly of the bore of the lock nut body and ring.

10 Claims, 1 Drawing Sheet

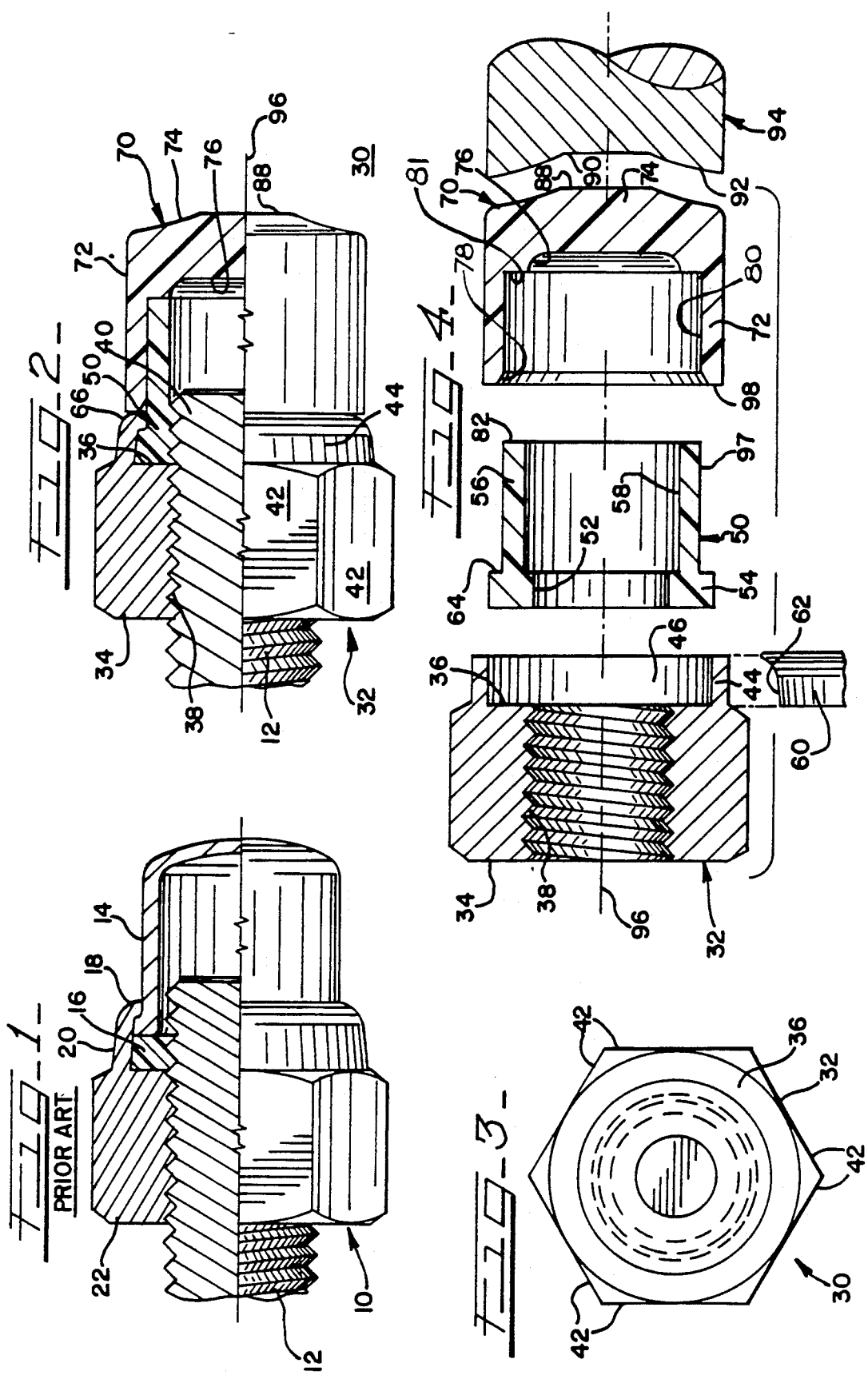

PLASTIC CAPPED LOCK NUT

BACKGROUND OF THE INVENTION

1. Field of the Invention

The present invention relates to a new and improved plastic capped lock nut particularly adapted to protect exposed threads on a threaded element threaded into the bore of the lock nut from one side and projecting outwardly from an opposite side of the nut body and lock ring.

2. Background of the Prior Art

Metal lock nuts having locking rings of resilient material have been used in a variety of applications wherein insurance against loosening of the nut is required on automobiles, trucks and other moving parts. When a lock nut is placed on a threaded element and tightened, oftentimes a portion of the threaded element extends outwardly of the lock nut and leaves exposed threads which can be damaged by contact with external objects, tools and other devices moving in close proximity thereto. In particular, when a lock nut and threaded element engaged therewith is movable relative to other adjacent parts, it is desirable to protect the exposed threads with a strong cap or enclosure so that damage does not occur which may later preclude a ready disassembly of the threaded element from the lock nut when desired.

OBJECTS OF THE INVENTION

In the past, metal caps and other types of relatively large, heavy and costly enclosures have been utilized and it is an object of the present invention to provide a new and improved capped lock nut wherein a strong yet somewhat resilient protective cap is provided to seal and enclose an otherwise exposed threaded portion of a threaded element on which the lock nut is tightened.

Another object of the present invention is to provide a new and improved plastic capped lock nut of the character described wherein a plastic cap is permanently secured to a resilient lock ring of the lock nut.

Yet another object of the present invention is to provide a new and improved plastic capped lock nut of the character described wherein a resilient lock ring of a lock nut and a plastic cap are joined together by a sonic weld in a focused sonic welding process.

Still another object of the present invention is to provide a new and improved plastic capped lock nut of the character described which is extremely economical to produce yet which provides ample protection for a threaded element extending outwardly of the metal body portion of the lock nut and resilient lock ring which is threaded thereon.

BRIEF SUMMARY OF THE INVENTION

The foregoing and other objects and advantages of the present invention are accomplished in a new and improved plastic capped lock nut having a metal body with a threaded bore and a pair of transversely extending opposite end faces. The body includes an annular wall integrally formed to extend outwardly of one of the end faces to define an open ended cavity for receiving a lock ring. A lock ring of resilient material is mounted in the cavity in coaxial alignment with the bore and closely abuts the adjacent end face of the metal nut body. An end cap formed of plastic material including an outer end wall and an annular side wall directly engages the lock ring and provides a space or closed protective chamber for an end portion of a threaded element projecting beyond the nut body and lock ring. The annular wall of the metal body defining the lock ring cavity is deflected or turned inwardly against the lock ring to tightly secure the ring in the cavity and prevent rotation of the lock ring relative to the metal body. The end cap faces the outer end of the metal body and is permanently secured to an outer end portion of the lock ring by sonic welding to provide an integral protective cover that is light in weight, low in cost, resilient yet strong to provide excellent protection against damage to threads on a threaded element on which the lock ring is tightened.

BRIEF DESCRIPTION OF THE DRAWINGS

For a better understanding of the present invention, reference should be had to the following detailed description taken in conjunction with the drawings, in which:

FIG. 1 is a side elevational view with a portion shown in longitudinal cross-section of a prior art metal capped lock nut;

FIG. 2 is a side elevational view with a portion shown in longitudinal cross-section of a new and improved plastic capped lock nut constructed in accordance with the features of the present invention and shown in threaded engagement on a threaded rod, bolt, cap screw, or the like;

FIG. 3 is an end elevational view of the capped end of the lock nut of FIG. 2; and FIG. 4 is an exploded, longitudinal cross-sectional view of the plastic capped lock nut of FIG. 2 before assembly of the parts thereof into a finished unit.

DETAILED DESCRIPTION OF THE INVENTION

Referring now more particularly to the drawings, in FIG. 1 is illustrated a prior art, metal capped lock nut 10 mounted on a threaded bolt 12 or the like and including a metal protective cap 14 which is secured against a resilient lock ring 16 by a rolled flange 18 of an annular wall 20 formed on one end face of a metal body 22 of the lock nut 10. Sometimes, a prior art lock nut 10 has encountered difficulty because of relatively high cost and heavy weight of the metal cap 14. In addition, rolling or crimping of the metal flange 18 is effective to engage only the metal cap 14 rather than the lock ring 16 itself, and sometimes the lock ring is not securely held against rotative slippage and thus does not function to provide the desired value of prevailing locking torque. If the cap 14 was formed of plastic material rather than metal, the same wall thickness would only provide a relatively weak cap structure because of the difference in strength between metal and plastic. Moreover, because of the bolt thread clearance required on the inside diameter and because the outside diameter of the cap is limited because of the inwardly directed rolled flange 18, a thicker wall design for a prior art cap 14 formed of plastic rather than metal would not be desirable from a strength standpoint.

Referring now to FIGS. 2, 3 and 4, therein is illustrated a new and improved plastic capped lock nut constructed in accordance with the features of the present invention and referred to generally by the reference numeral 30. The lock nut 30 includes a metal body 32 having a pair of transversely extending, opposite end faces 34 and 36 formed at opposite ends of an axially extending threaded bore 38 adapted to receive a threaded element 12 engaged therewith. Typically, the threaded element 12 has an outer or free end portion 40 which extends outwardly of the end face 36 as shown in FIG. 2. The metal nut body 32 includes a number of angularly intersecting flats or side faces 42 adapted to cooperate with a wrench or other tool used for tightening the nut 30 on the threaded element 12 to a desired level of torque. The metal body 32 also includes an integrally formed cylindrical, annular side wall 44 projecting outwardly of the end face 36 to define an open ended cavity 46 (FIG. 4) for receiving a resilient lock ring 50, formed of plastic such as a "Nylon" resin adapted to provide a prevailing torque when the lock nut 30 is threaded onto the element 12.

The annular lock ring 50 includes an initially smooth cylindrical, central bore in coaxial alignment with the threaded bore 38 of the metal body 32. The central bore of the lock ring 50 comprises a small diameter bore segment 52 having a diameter that is substantially equal to or less than the minimum or minor thread diameter of the threaded bore 38 of the metal body 32. The small diameter bore section 52 is formed in a relatively thick wall section 54 of the lock ring 50 and the outer diameter of the thick wall section 54 is adapted to closely fit within the cylindrical cavity 46 formed by the integral side wall 44 on the metal body 32.

When the threads on the threaded element 12 engage the inner bore surface of the small diameter bore 52, the resilient material of the lock ring 50 is displaced and this displacement and frictional engagement provides a prevailing locking torque for the lock nut 30 to prevent inadvertent rotation or loosening at torque values less than the locking or prevailing torque that is desired. The lock ring 50 also includes a thin wall segment 56 having a larger diameter bore 58 that is greater than the small diameter bore 52 and substantially equal to or slightly greater than the outer or major diameter of the threads on the threaded element 12. The larger diameter bore 58 of the thick wall segment 56 does not add to the prevailing torque of the lock ring 50 and provides a measure of relief when the outer end portion 40 of the threaded element 12 reaches the end of the small diameter bore section 52.

The lock ring 50 is secured in the cavity 46 of the metal body 32 against relative rotation by the inwardly turned deflection of an outer end portion of the annular side wall 42. This deflection is accomplished by the use of a tool 60 (FIG. 4) having a curved surface 62 adapted to turn the outer end of the side wall 44 inwardly against a radial shoulder surface 64 on the lock ring 50. The tool 60 is moved inwardly in a radial direction towards the central axis of the threaded bore 38 as the nut body 32 is spun about a central axis of the bore 38. Once the outer end of the annular side wall 44 is deflected inwardly as shown by the numeral 66 in FIG. 2, the locking ring 50 is positively secured to the metal body 32 and relative rotation between the ring and body is precluded because of the compressive force exerted by the wall 44 and the inturned end flange 66 against the thick wall segment 54 of the resilient lock ring 50.

In accordance with the present invention, the lock nut 30 includes a plastic end cap 70 preferably formed of plastic such as a "Nylon" resin. The resilient "Nylon" resinous material is designed to enclose the cavity 46 on the nut body 32 and protect exposed threads on the extended outer end portion 40 of a threaded element 12 in threaded engagement with the plastic capped lock nut 30 as shown in FIG. 2.

The end cap 70 includes an annular, generally cylindrical side wall 72 integrally joined to a circular outer end wall 74 forming an enlarged internal cavity or chamber 76 adapted to accommodate and enclose an outer end portion 40 of a threaded element 12 threadedly engaged by the capped lock nut 30. Because the plastic end cap 70 is formed of relatively light-weight but strong, resilient plastic material, the overall weight of the plastic capped nut 30 is less than the prior art nut 10 which employs a heavier, more costly metal protective cap 14. Moreover, because lighter weight material is used, the plastic end cap 70 can be made to have relatively thick wall sections for the side wall 72 and the end wall 74 to provide added strength with some resiliency to better withstand contact and blows from external objects. The inner compartment or chamber 76 of the end cap 70 has a transverse diameter substantially the same as that of the larger bore 58 of the lock ring 50 so as to readily accommodate the threaded end portion 40 of a threaded element 12 in threaded engagement with the metal nut body 32.

In accordance with the invention, the open end of the annular side wall 72 of the plastic cap 70 is formed with a frustoconically shaped, annular groove 78 on the inside surface providing a slight taper or chamfer angle (for example 10°) to establish an interference fit with an outer cylindrical surface 97 of the thin wall segment 56 of the lock ring 50 when the elements are compressed together axially to form a completed capped lock nut 30. The frustoconical tapered shape of the groove 78 aids in guiding the end cap 70 into a coaxially centered position on the thin wall segment 56 of the lock ring 50 so that focused sonic welding can be accomplished to permanently secure the parts 50 and 70 together. The groove 78 joins a cylindrical bore surface 80 which terminates at an annular radial end face 81 abutting an outer end face 82 of the lock ring 50. The outer end wall 74 of the plastic end cap 70 includes a raised central portion 88 on the outer surface which is designed to fit and seat within a shallow recess 90 formed on a matching facial surface 92 of a sonic welding horn 94 used for directing vibratory sonic welding energy to the plastic lock ring 50 and the end cap 70 for securing these parts permanently together in place after the lock ring has been mounted in the cavity 46 and secured to the nut body 32 by the inturned flange portion 66 on the integal side wall 44.

In a following assembly step prior to sonic welding, the end cap 70 is moved axially from right to left as shown in FIG. 4 by travel of the sonic welding element 94 in a direction along the axial bore as indicated by the line 96 until the outer corner edge of the end face 82 of the lock ring 50 engages the groove 78 and the bore 80 on the end cap 70. As this engagement occurs, sonic welding energy from the welding horn 94 is transmitted through the end surfaces 90 and 92 of the horn to the outer end surface of the cap end wall 74 and is then concentrated or focused in a cylindrical shaped area of between the surfaces 80 and 97 interference. The focusing of sonic welding energy in the areas of interference fit between the lock ring 50 and the end cap 70 causes the material in this region to rapidly melt and soften thereby forming a tight seal and weld of considerable strength when the plastic material of the ring 50 and end cap 70 cools and hardens.

The open mouth of the cap 70 formed by the tapered groove 78 and the 10° chamfer angle allows an aperture large enough so that the cap 70 can drop over the ring 50 in the assembly process. Somewhere along the chamfer of the groove 78, but before contact with the surface 80, an interference fit is established.

Moreover, the frustoconically shaped surface 78 of the end cap 70 is expanded inwardly slightly by the sonic welding process to closely interfit and weld against the outer surface 97 of the thin wall lock ring segment 58 of the lock ring 50 and a radial end face 98 of the end cap 70. The end face 98 of the plastic cap 70 permanently abuts and seats against the inturned flange segment 66 on the metal nut body 32 as shown in FIG. 2 and also provides a tight seal around the enclosed compartment 76 of the end cap 70. When the end cap 70 is sonically welded in place as described, the cap provides excellent protection against damage to the otherwise exposed threads on the outer end portion 40 of a threaded element 12 which project beyond the lock ring 50 and the threaded bore 38 of the metal nut body 32. The focused sonic welding energy rapidly fuses the end cap 70 to the lock ring 50 thereby forming a permanent and strong bond between the material of these interfitting parts providing strong but light weight protection for the threaded end section 40. The somewhat resilient plastic cap 70 is tightly and permanently secured in place and affords excellent protection for a threaded element 12 at a minimum of cost and with a minimum of weight.

Many modifications and variations of the present invention are possible in light of the foregoing specification and thus, it is to be understood that within the scope of the appended claims, the invention may be practiced otherwise than as specifically described.

What is claimed and desired to be secured by Letters Patent of the United States is:

1. A plastic capped lock nut comprising:
   a metal body having a threaded bore extending axially between transverse opposite end faces and including an annular wall extending outwardly of one of said end faces to define an open ended cavity for receiving a lock ring;
   a lock ring of resilient material mounted in said cavity in coaxial alignment with said bore against said one end face of said body; and
   an end cap formed of plastic material including an outer end wall and an annular side wall engaging said lock ring, said annular wall of said metal body having an outer end deflected against said lock ring to secure said ring in said cavity against rotation relative to said body, said end cap facing said outer end of said body and secured to an outer end portion of said lock ring.

2. The plastic capped lock nut of claim 1, wherein:
   said lock ring includes a thick wall segment adjacent said one end face of said body engaged by said deflected outer end of said annular wall of said metal body and a thin wall segment extending outwardly thereof forming said outer end portion of said ring for securement to said end cap.

3. The plastic capped lock nut of claim 1, wherein:
   said lock ring and said end cap are secured together by sonic welding.

4. The plastic capped lock nut of claim 3, wherein:
   said cap nut includes an internal shoulder in engagement with said outer end portion of said lock ring.

5. The plastic capped lock nut of claim 4, wherein:
   said end cap abuts against said deflected outer end of said annular wall of said metal body.

6. The plastic capped lock nut of claim 4, wherein:
   said lock ring includes a cylindrical outwardly facing annular surface for confronting a frusto-conical inwardly facing annular surface adjacent said shoulder on said end cap.

7. The plastic capped lock nut of claim 6, wherein:
   said frustoconical surface of said end cap tapers from a maximum diameter adjacent an outer end said metal body toward a minimum diagmeter adjacent said shoulder.

8. The plastic capped lock nut of claim 4, wherein:
   said internal shoulder comprises a surface generally normal to said axial bore; and
   said end cap includes a second narrower shoulder spaced axially of said first mentioned internal shoulder toward said outer end wall of said end cap and adapted to first encounter said lock ring when said end cap and lock ring are sonically welded.

9. The plastic capped lock nut of claim 8, wherein:
   said second shoulder has an outer diameter slightly larger than the outer diameter of said first mentioned internal shoulder forming a friction point which tends to melt first when sonic welding energy is applied to weld said lock ring and end cap together.

10. The plastic capped lock nut of claim 9, wherein:
    said narrow second shoulder has a width radially of said bore that is substantially less than the width of said first mentioned shoulder measured radially of said bore.

* * * * *